United States Patent Office 3,472,849
Patented Oct. 14, 1969

3,472,849
PYRAZINO-[2,3-b]-PYRAZINES
Giorgio Palamidessi, Maria Antonietta Verini, and Armanda Fioretti, Milan, Italy, assignors to Societa Farmaceutici Italia, Milan, Italy, a corporation of Italy
No Drawing. Filed Feb. 12, 1968, Ser. No. 704,511
Claims priority, application Italy, Feb. 15, 1967, 12,638/67
Int. Cl. C07d 51/82; A61l 23/00
U.S. Cl. 260—250                    5 Claims

ABSTRACT OF THE DISCLOSURE

Described are new pyrazino-[2,3-b]-pyrazines of the formula

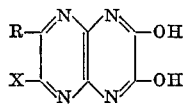

where X is selected from bromine and chlorine and R is selected from hydrogen, bromine and chlorine. These are useful for their antiviral activity, particularly to herpes virus. Also described is the preparation of these new pyrazino-[2,3-b]-pyrazines.

---

The present invention has as its object pyrazino-[2,3-b]-pyrazines and the process for preparing them.

More particularly, our invention provides the new compounds, mono- and dihalo-substituted 2,3-dihydroxy-pyrazino-[2,3-b]-pyrazines of the structure

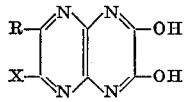

where X is a bromine or chlorine atom and R is a hydrogen, bromine or chlorine atom, and the process for their preparation. They may be prepared from the corresponding mono- or dihalo-substituted 2,3-diamino-pyrazines by reaction with a dialkyl-oxalate in the presence of a suitable condensing agent such as an alkali alcoholate.

The compounds of the invention show an interesting antiviral activity particularly with reference to herpes virus against which they display a surprising inhibiting action.

In literature very few compounds having a pyrazino-[2,3-b]-pyrazine structure are known; for none of them is a pharmacological activity indicated.

The new mono- or dihalo-pyrazino-[2,3-b]-pyrazines, which are the object of the present invention, are prepared by a process which may be generally indicated as follows: The starting material 5-halo- or 5,6-dihalo-2,3-diamino-pyrazine, dissolved in a suitable solvent, such as a lower alcohol, for example methyl-, ethyl- and propyl alcohol, is treated with the oxalic acid dialkyl ester wherein the alkyl has from 1 to 4 carbon atoms and heated up to the solvent boiling temperature. The condensation reaction for closing the second pyrazinic ring is accelerated and facilitated by using an alkali alcoholate such as sodium ethylate or methylate. Otherwise such a reaction would require, as is known in literature, very high temperatures for several hours. From the reaction mixture, 6-halo- or 6,7-dihalo-2,3-dihydroxy-pyrazino-[2,3-b]-pyrazines are isolated, filtered, dissolved in water, treated with a dilute acid such as hydrochloric, sulphuric or acetic acid and are thus isolated according to known techniques.

The compounds of the invention are light yellow crystals, soluble in alkali, stable to light and heat. Their elective activity allows their classification among antiviral products.

The antiviral activity of 2,3-dihydroxy-6-bromo-pyrazino-[2,3-b]-pyrazine has been studied by tests in vitro and in vivo. In vitro, the compound has been studied on influenza virus APR 8 in corionallantoidea membrane, influenza virus A2W29 in corionallantoidea membrane (CAM), Newcastle virus on chicken embryo calls culture, virus vaccine on a Hela cells culture, virus Herpes zoster (human isolation strain) on a Hela cells culture, virus Herpes simplex (strain HF) on a Hela cells culture. The most surprising activity has been observed in Herpes simplex virus, for the reduction of the cytopathogenic effect (CPE), (95%), as well as for the inhibition of the production of infecting virus (100%). The most active doses of product are 40 γ/cc. These doses are not toxic for cellular cultures.

The most significant data of these experiments have been obtained:

On virus Vaccine WR (Hela cells culture on lamella)
(a) activity on cytopathogenic effect (CPE)—treatment during 40 hours 40 γ/cc. give a protection of 64%
20 γ/cc. give a protection of 46.6%
10 γ/cc. give a protection of 50%
2 γ/cc. give a protection of 17%

(b) inhibition of the production of infecting virus:

40 γ/cc. activity 85–90%
20 γ/cc. activity 70–65%
10 γ/cc. activity 58–54%.

On virus Herpes zoster (Rapp. Benyesh, Melnick, Science 141, 433, 1963) inhibition of the production of infecting virus:

40 γ/cc. activity about 80%
20 γ/cc. activity about 25%.

On virus Herpes simplex (strain HF) (a) activity on cytopathogenic effect (CPE)—treatment for 72 hours 40 γ/cc. give a protection of 95%
20 γ/cc. give a protection of 70%
10 γ/cc. give a protection of 66%

(b) inhibition of the production of infecting virus:

40 γ/cc. activity 100%
20 γ/cc. activity 99.25%
10 γ/cc. activity 98.4%.

In vivo, the tests had been carried out on the experimental herpetic keratitis on rabbits obtained by infecting the cornea, after scarification, with strains of virus Herpes simplex of human isolation. The treatment always started 3 days after the infection. In all cases a few treatments by day for a period of 5–6 days were sufficient to determine a therapeutic activity revealed by a favorable course of the illness, remarkable reduction of the number of corneal ulcers, reduction or disappearance of the complications of the illness.

The acute toxicity of 2,3-dihydroxy-6-bromo-pyrazino-[2,3-b]-pyrazine on mouse gave the data reported in the following table.

| Compound | Administration route | $LD_{50}$ in mg./kg. |
|---|---|---|
| 2,3-dihydroxy-6-bromo-pyrazino-[2,3-b]-pyrazine. | Subcutaneous | 75 |
| | Oral | 72.3 |
| | Intraperitoneal | 15 |

Furthermore, the antiviral activity of 2,3-dihydroxy-6-bromo-pyrazino-[2,3-b]-pyrazine has been tested in comparison with iodine-deoxyuridine (IDU) which is one of the most efficient and diffuse products in the antiviral field. In vitro on culture of cells infected with virus Herpes zoster (Rapp. Benyesh, Melnick, Science 141 (1963) 433) the compound at the dose of 20 γ/cc. shows an activity similar to that of iodine-deoxyuridine without causing any cytological alteration and without inhibiting cellular multiplication. In vivo (E. G. Engle and R. C. Stewart, J. Immunol. 92 (1964) 730), the compound shows on experimental kerato-conjunctivitis on rabbits a therapeutical activity higher than that of iodine-deoxyuridine. Particularly, it has been demonstrated that the 2,3-dihydroxy-6-bromo-pyrazino-[2,3-b]-pyrazine does not require, as does iodine-deoxyuridine, continuous and frequent treatments over a long period of time in order to have a good therapeutic action.

The following examples are to illustrate the invention without limiting it.

EXAMPLE 1

2,3-dihydroxy-6-bromo-pyrazino-[2,3-b]-pyrazine 7.1 g. of 2,3-diamino-5-bromo-pyrazine (B. Camerino and G. Palamidessi, Gazz. Chim. Ital. 90 (1960) p. 1807) and 6.4 cc. of diethyloxalate in 100 cc. of ethanol were brought to boil. To the boiling and stirred solution, sodium ethylate in ethanol, prepared by dissolving 2.14 g. of sodium in 40 cc. of ethanol, was added drop by drop during one hour. The addition of sodium ethylate being ended, the mixture, which now contains an abundant quantity of dispersed yellow solid, was kept at boiling and under stirring for another 3-4 hours. The mixture was then cooled and the solid filtered off and repeatedly washed with ethanol. The solid was then dissolved in 130 cc. of water. From the solution, 8 g. of 2,3-dihydroxy-6-bromo-pyrazino-[2,3-b]-pyrazine precipitate upon acidifying with dilute hydrochloric acid. Melting point about 350-360° C. (with decomposition), yield 87%.

2,3-dihydroxy-6-chloro-pyrazino-[2,3-b]-pyrazine (M.P. about 350° C. with decomposition) can be similarly prepared.

EXAMPLE 2

2,3-dihydroxy-6,7-dichloropyrazino-[2,3-b]-pyrazine

Operating as described in Example 1, 2.4 g. of 2,3-diamino-5,6-dichloropyrazine and 2.1 cc. of diethyloxalate in 32 cc. of anhydrous ethanol, were treated with sodium ethylate, prepared from 0.71 g. of sodium in 13 cc. of ethanol. The reaction product was washed with ethyl alcohol and dissolved in boiling water. The solution was decolorized with carbon, filtered, acidified, boiled and evaporated to dryness. From the residue, washed 2-3 times with a small quantity of water, 2 g. of 2,3-dihydroxy-6,7-dichloropyrazino-[2,3-b]-pyrazine, melting at about 360° C. (with decomposition), were obtained.

We claim:
1. Pyrazino-[2,3-b]-pyrazine of the formula

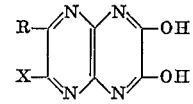

where X is selected from bromine and chlorine and R is selected from hydrogen, bromine and chlorine.

2. The compound of claim 1, which is 2,3-dihydroxy-6-bromo-pyrazino-[2,3-b]-pyrazine.

3. The compound of claim 1, which is 2,3-dihydroxy-6-chloro-pyrazino-[2,3-b]-pyrazine.

4. The compound of claim 1, which is 2,3-dihydroxy-6,7-dichloro-pyrazino-[2,3-b]-pyrazine.

5. Process for preparing pyrazino-[2,3-b]-pyrazines of the formula

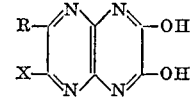

where X is selected from bromine and chlorine and R is selected from a hydrogen, bromine and chlorine, which comprises condensing the corresponding 5-halo- or 5,6-dihalo-2,3-diamino-pyrazine with an alkyl-oxalate in the presence of sodium ethylate.

References Cited
UNITED STATES PATENTS 2,345,236  3/1944  Chitwood et al. _____ 260—268
2,345,237  3/1944  Chitwood et al. _____ 260—268

NICHOLAS S. RIZZO, Primary Examiner

U.S. Cl. X.R.

424—250